April 28, 1959   W. J. BRADBURN, JR., ET AL   2,884,578
STATIC CURRENT LIMIT REGULATOR FOR MOTOR SYSTEM
Filed May 28, 1956   3 Sheets-Sheet 1

INVENTORS
Elmer G. Conger,
BY William J. Bradburn, Jr.
Hans R. A. Hansen,
Wilkinson, Huxley, Byron & Hume
ATTYS.

April 28, 1959 W. J. BRADBURN, JR., ET AL 2,884,578
STATIC CURRENT LIMIT REGULATOR FOR MOTOR SYSTEM
Filed May 28, 1956 3 Sheets-Sheet 2
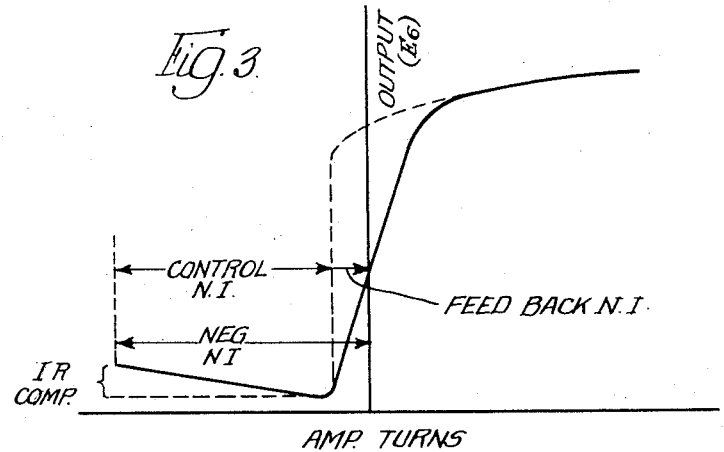
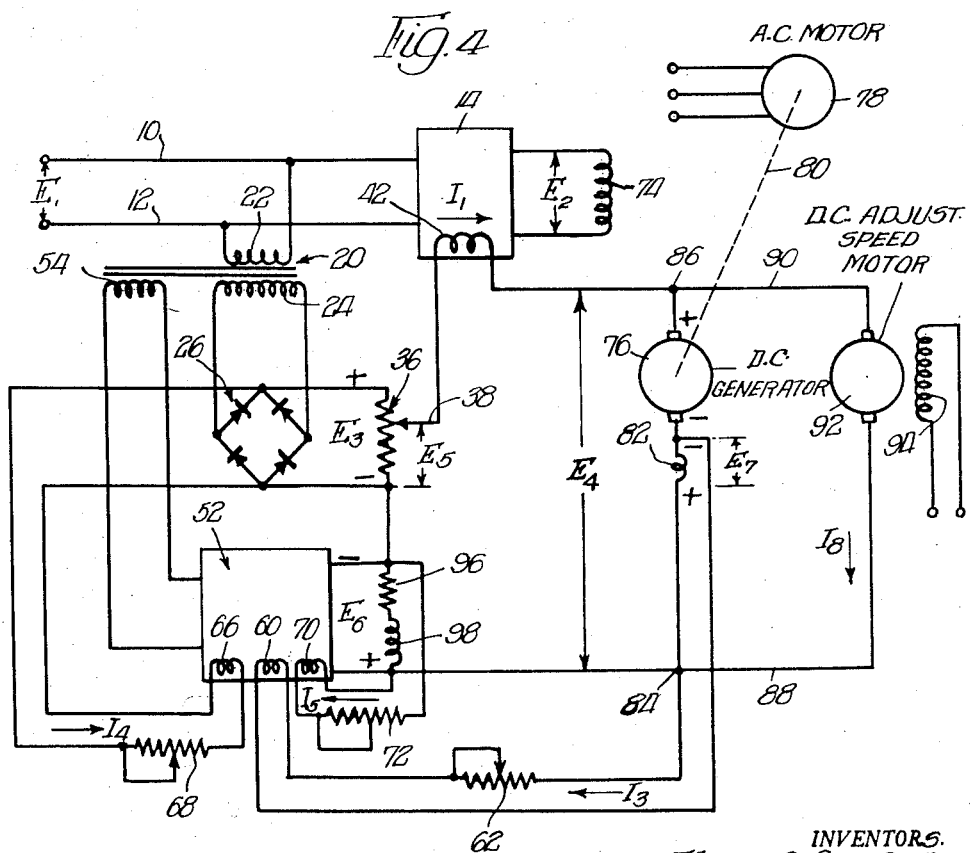
INVENTORS.
Elmer G. Conger,
William J. Bradburn, Jr.
BY Hans R. A. Hansen,

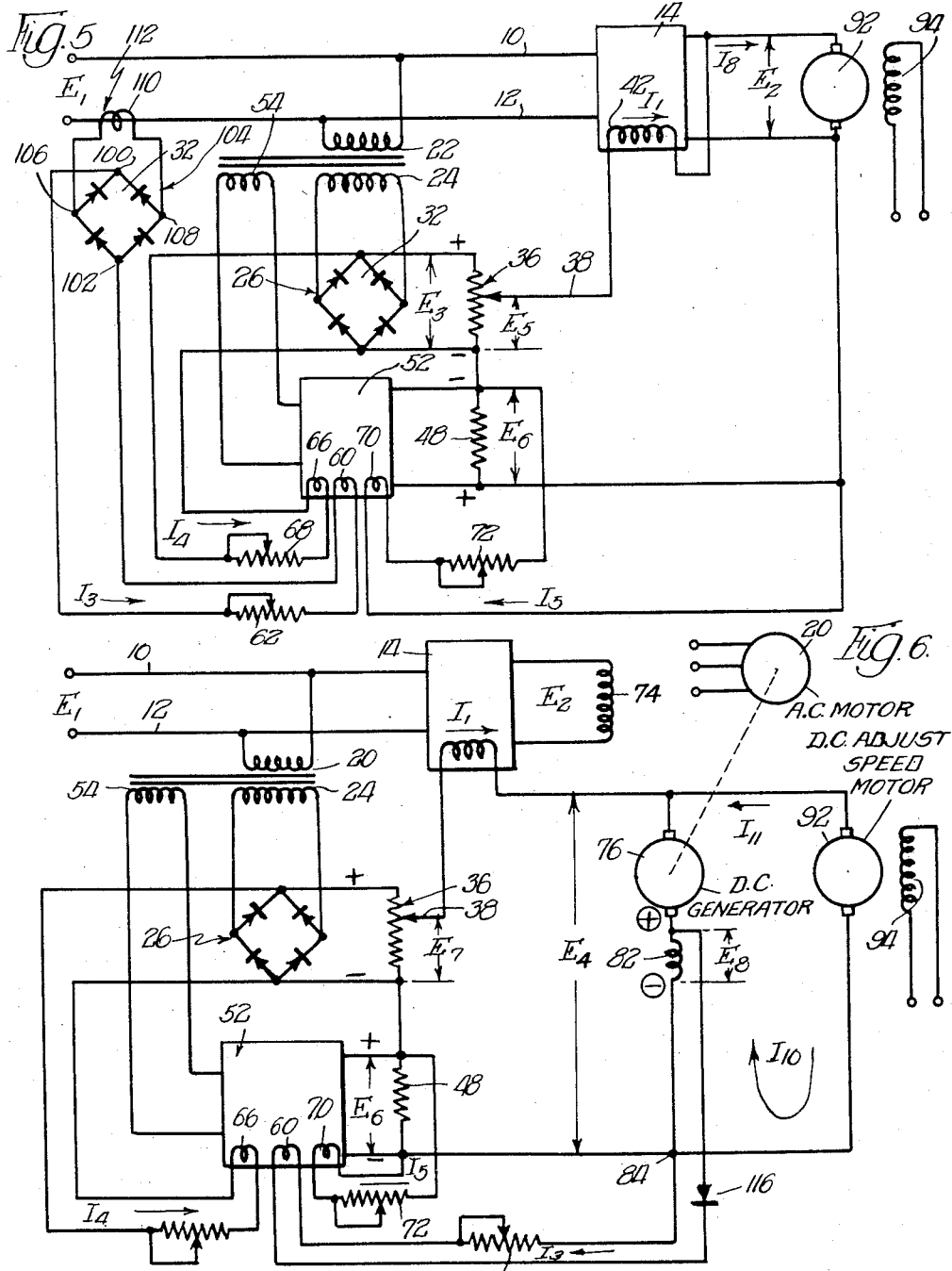

United States Patent Office 2,884,578
Patented Apr. 28, 1959

2,884,578

STATIC CURRENT LIMIT REGULATOR FOR MOTOR SYSTEM

William J. Bradburn, Jr., Milwaukee, and Elmer G. Conger and Hans Richard Ansgar Hansen, Cudahy, Wis., assignors to The Louis Allis Co., Milwaukee, Wis., a corporation of Wisconsin Application May 28, 1956, Serial No. 587,680

17 Claims. (Cl. 318—143)

This invention relates to a current limiting circuit for direct current electric motors and more particularly to a circuit of this type which may be combined with a closed loop, adjustable speed control.

The invention disclosed herein provides an adjustable, automatic maximum current limiting circuit for a speed controlled motor, the limiting action of which is independent of load variations. A novel aspect is that the current limiting circuit also provides an IR compensating voltage when the motor current is less than the limit current value selected. Furthermore, an automatic current limit on acceleration is provided, which is independent of load inertia and change in speed of the motor. Similar control of the current may likewise be provided on deceleration.

It is therefore an object of this invention to provide an adjustable, automatically operable, maximum current limiting circuit for a speed controlled motor, the operation of which is independent of load variations.

It is also an object of this invention to provide a current limiting circuit which may be incorporated in an adjustable speed drive of the character described so that the controlled motor is normally maintained at a selected speed in spite of variations in the load but when a given load is reached, the motor current is maintained constant and the motor speed is automatically reduced.

Another object is to provide an automatic current limiting circuit in a motor control circuit of the character described which operates on acceleration of the controlled motor, independently of load inertia and changes in speed of that motor.

Still another object is to provide a motor control circuit which is similarly operable to automatically limit the current to the controlled motor on deceleration, independently of load inertia and changes in speed of the controlled motor.

Yet another object of this invention is to provide a speed regulating and current limiting circuit for an electric motor which circuit is operable to provide an IR compensating voltage when the motor current is less than the selected limit current value, but which likewise operates to limit the current to the controlled motor when a preselected current value is reached.

Another object is to provide a control circuit of the character described which utilizes a magnetic amplifier speed control circuit with a second magnetic amplifier so incorporated therein that the magnitude of the current flowing in the control winding of the first magnetic amplifier is effected sharply by an increase in the motor load current, above a preselected value.

Further objects and advantages of this invention will become evident as the description proceeds and from an examination of the accompanying drawing which illustrates one embodiment of the invention and in which similar numerals refer to similar parts throughout the several views.

In the drawings:

Figure 3 is a graphical representation of the manner in which the limiting magnetic amplifier incorporated in the circuit disclosed in Figure 1 operates.

Figure 4 is a circuit diagram of an adjustable speed control circuit incorporating the invention, utilizing the Ward-Leonard system for varying the motor speed, some of the elements being shown diagrammatically.

Figure 5 is a circuit diagram of an adjustable speed drive incorporating the invention using static armature control of the drive motor.

Figure 6 is a circuit diagram of an adjustable speed drive of the same general type as shown in Figure 4 with the circuit being designed to provide current limitation on deceleration of the drive motor, some of the elements being shown diagrammatically.

Figure 1:
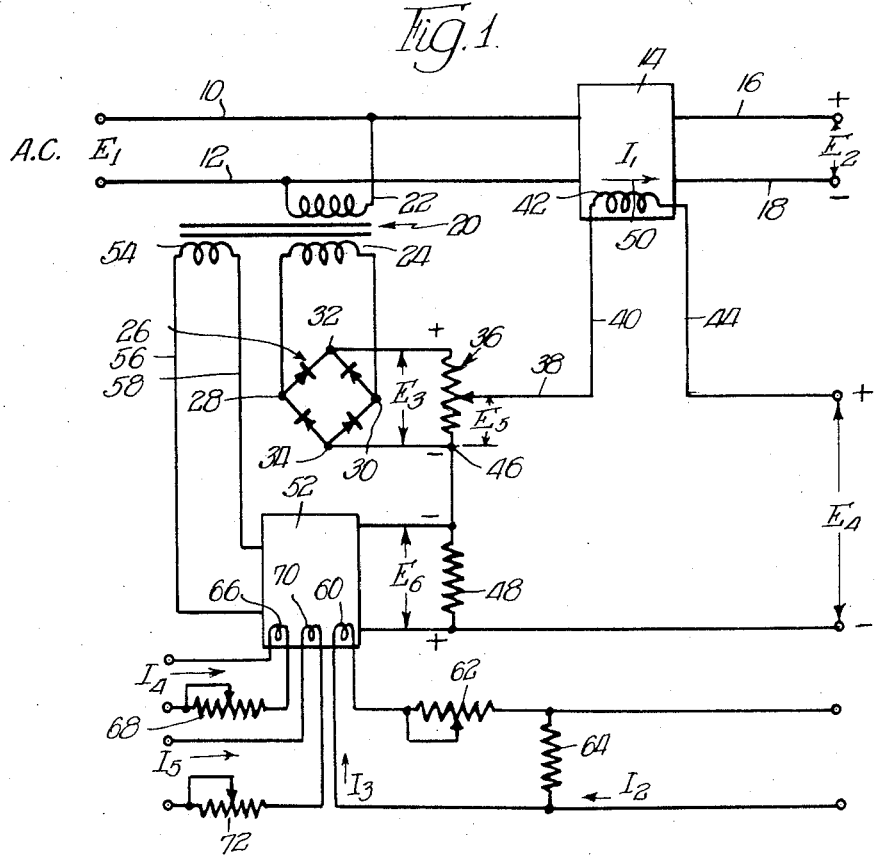
Figure 1 is a circuit diagram illustrating one embodiment of the invention, some of the elements thereof being shown diagrammatically.

Referring now to Figure 1, an adjustable speed drive for operation on alternating current power, utilizing a magnetic amplifier control circuit for a direct current electric motor is shown therein in somewhat diagrammatic form. Lines 10 and 12 represent a source of line voltage $E_1$ which may be a 220 volt supply at 60 cycles per second. A magnetic amplifier, shown diagrammatically and indicated generally by the numeral 14, has an alternating current voltage $E_1$ applied to the input terminal thereof. This amplifier may be a full wave, self-saturated type having a direct current output $E_2$ across the output lines 16 and 18. This output voltage $E_2$ may be utilized to control the speed of the drive motor to be controlled, either by (1) the application of the voltage $E_2$ directly to the controlled motor armature, or (2) the application of the voltage $E_2$ to the field winding of a direct current generator, which in turn supplies the armature voltage to the controlled motor.

An isolation transformer, indicated generally by the numeral 20, has its primary winding 22 connected across the alternating current input lines 10 and 12. The secondary winding 24 thereof has the rectifier bridge, indicated generally by the numeral 26, connected across the input terminals 28 and 30 thereof. The direct current output voltage $E_3$ obtained from the output terminals 32 and 34 of the rectifier bridge is applied across the resistance of the speed setting potentiometer 36, so that the voltage has a polarity as indicated in Figure 1. The movable arm 38 of the potentiometer 36 is connected through the line 40 to one end of the control winding 42 of the magnetic amplifier 14. The opposite end of the control winding 42 is connected through the line 44 to the positive terminal of a source of feedback voltage $E_4$, substantially proportional to the speed of the controlled motor. Such a voltage can be obtained directly from the armature of the controlled motor in the form of a back E.M.F., from a tachometer generator, or from other similar means. The negative terminal of the source of feedback voltage $E_4$ is connected to the negative end 46 of the resistor of the speed setting potentiometer 36 through a load resistor 48, the function of which will be subsequently described.

The portion of the circuit just described, excluding the load resistor 48, forms an adjustable speed drive which operates in the following fashion. The current $I_1$ which flows in the control winding 42 of the magnetic amplifier 14 determines the magnitude of the control voltage $E_2$ appearing across the output terminals of the magnetic amplifier 14. The magnitude of the voltage $E_2$ in turn determines the magnitude of the voltage applied to the armature of the controlled motor and thus the speed of that motor. The polarity of the control winding 42 is such that an increase in $I_1$ in the direction indicated by the arrow 50 has the effect of increasing the output voltage $E_2$ and thus the speed of the controlled motor. Disregarding for the moment the effect of the load resistor 48, the magnitude of the current $I_1$ in the control winding 42 is determined by the difference between the voltage $E_5$, which appears across the selected portion of the resistance of the speed potentiometer 36 (as indicated in Figure 1), and the feedback voltage $E_4$. Any change in motor load, with a resultant change in motor speed, is accompanied by a change in the magnitude of the feedback voltage $E_4$. This varies the magnitude of the resultant voltage which alters the magnitude of the current $I_1$, so that the output voltage $E_2$ of the magnetic amplifier 14 is altered. The voltage applied to the armature of the controlled motor is likewise changed, the circuit being connected so that the change is in a direction such as to tend to bring the motor speed back to its original value. Therefore, with a particular setting of the speed setting potentiometer 36, the controlled motor will tend to maintain a speed commensurate with that setting, regardless of changes in the motor load.

The control established by this portion of the circuit just described is not fully satisfactory, since no compensation is provided for the IR drop in the motor. The absence of such compensation would result in the motor having a speed drop from no load to full load, in spite of the form of control just described. Not only is it desirable to provide compensation for the IR drop in the motor, but as indicated above, it is also highly desirable to provide a means of limiting the maximum current to the motor, which is independent of load variations.

These two objectives have both been achieved in a relatively simple but very effective way by the addition of a second magnetic amplifier, indicated generally by the numeral 52, in the control circuit as shown in Figure 1. The secondary winding 54 of the isolation transformer 20 provides a source of input voltage to the second magnetic amplifier 52 through the lines 56 and 58. The output voltage $E_6$ is impressed across the load resistor 48 with the polarities as shown in Figure 1, namely, in opposition to the polarities of the voltage $E_5$ appearing across the selected variable portion of the speed setting potentiometer 36, previously mentioned.

The second magnetic amplifier 52 is provided with a control winding 60 which is connected through a variable resistance 62 to a source of current $I_2$ which is proportional to the load current of the controlled motor. A load resistor 64 is also connected across the source of $I_2$ and a current $I_3$ also proportional to the load current of the controlled motor will flow in the control winding 60, the magnitude of which is preselected by an adjustment of the variable resistance 62 for a purpose that will subsequently appear.

The second magnetic amplifier 52 is also provided with a negative bias winding 66 which is connected to a suitable source of negative bias voltage through the variable resistance 68 so that a current $I_4$ flows through the winding 66. The variable resistance 68 can be preset to a predetermined value so that the bias current $I_4$ has a value such that the output voltage $E_6$ of the second magnetic amplifier 52 is normally quite low. The magnitude and direction of $I_1$ through the control winding 42 of the magnetic amplifier 14 will then normally be determined principally by the difference between $E_5$ and $E_4$ as previously explained.

The second magnetic amplifier 52 is also provided with a positive feedback winding 70 which is connected through the variable resistance 72 to a suitable source of positive feedback current $I_5$, in turn connected to the output of said magnetic amplifier.

As previously indicated, the second magnetic amplifier 52 circuit provides not only a means of limiting the current to the controlled motor but also, until such time as the maximum current is reached and limiting occurs, provides an IR compensating voltage $E_6$. This output voltage $E_6$ of the second magnetic amplifier 52 is applied to the load resistor 42 and until such time as limiting commences, acts as an IR compensating voltage. This characteristic is illustrated in Figure 3 which indicates that over the normal load range of the controlled motor, before limiting occurs, the output voltage $E_6$ decreases in value substantially in proportion to the change in load current. This decrease in $E_6$, as the load increases, has the same effect in the feedback circuit of the magnetic amplifier 14 as that which is obtained by the more conventional method of obtaining IR compensation by adding a voltage (with a polarity opposite to $E_6$) which increases with load current. Since $E_6$ is opposite in polarity to $E_5$, a decrease in $E_6$ will be the equivalent of adding a voltage to $E_5$. This IR compensation voltage $E_6$ can be adjusted in magnitude by varying $I_4$ through adjustment of the variable resistor 68. Likewise, the load resistor 48 can be properly selected so that the change in $E_6$ from no load to full load of the motor will correspond to the change in IR drop in the motor.

Figure 2:
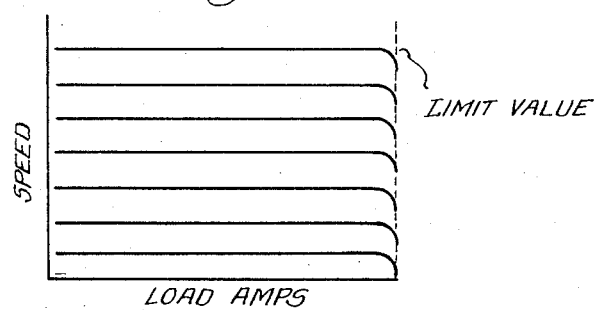
Figure 2 is a graphical representation of the type of control achieved by the use of circuits embodying the present invention, the speed of the controlled motor being plotted against the motor load current.

As shown in Figure 3, however, the output voltage $E_6$ of the secondary magnetic amplifier 52 suddenly increases rapidly when the current $I_3$ achieves a selected value, as determined by the setting of the variable resistance 62. The positive feedback current $I_5$ permits very sharp limiting to be obtained, since the output voltage $E_6$ will rise sharply, tending to reverse the direction of $I_1$ and thus decreasing the magnitude of $E_2$ and sharply decreasing the controlled motor armature voltage and speed, as represented by the graphical illustration in Figure 2. In order to obtain such sharp limiting, the change in limiting NI, from the time that the limiting commences until the time that the motor is stalled, if the shaft is locked, must be small compared to the total control NI. This is accomplished by the use of the positive feedback previously mentioned. The variable resistance 72 can be set to give the type of output characteristic to the magnetic amplifier 52 shown in Figure 3 and indicated by the nearly vertical dotted line, rather than the normal output characteristic indicated by the solid line.

As shown in Figure 3, the action of the current limiting magnetic amplifier 52, is therefore, to suddenly increase its output voltage $E_6$ when limiting occurs, which voltage opposes the voltage $E_5$. This increase in $E_6$ causes the current $I_1$ to decrease in magnitude in the direction shown, thus causing $E_2$ to be decreased and the controlled motor speed to be lowered very sharply with any further increase in load current.

It can thus be seen that the triple objective of speed control, IR drop compensation and current limiting has been accomplished with a relatively simple circuit which is both reliable and effective, and which provides very sharp limiting at any selected value of load current.

An adjustable speed control using the Ward-Leonard system for motor speed control incorporating the invention is shown in Figure 4. In this system the output voltage $E_2$ of the primary magnetic amplifier 14 is applied to the field winding 74 of a direct current generator 76 which is driven by suitable alternating current motor 78, as indicated by the broken line 80 in Figure 4. The direct current generator 76 has an interpole winding 82 disposed in series with the armature between the negative output terminal 84 and the armature. The output terminals 84 and 86 of the direct current generator 76 are connected by the lines 88 and 90 across the armature of the direct current motor 92, the speed of which is to be controlled. The field winding 94 of the motor 92 is separately excited from a suitable source.

The control winding 42 of the magnetic amplifier 14 has one end connected to the speed setting potentiometer 36, as previously mentioned in connection with the circuit shown in Figure 1. The load resistor 96 is connected in series with the speed setting potentiometer 36 substantially as the load resistor 48 previously described in connection with Figure 1. The bucking field winding 98 of the direct current generator 76 is also connected in series with the load resistor 96 for a purpose which will subsequently appear. Disregarding the load resistor 96 and the bucking field winding 98, it can be seen that a feedback voltage $E_4$ proportional to the speed of the controlled motor is applied to the loop containing the control winding 42 and the speed setting potentiometer 36 with a polarity opposed to the polarity of the reference voltage $E_5$ obtained from the speed setting potentiometer 36. Likewise, a negative bias winding 66 is provided in the secondary magnetic amplifier, indicated generally by the numeral 52, and a negative bias voltage is applied thereto through the variable resistance 68 from the rectifier bridge 26, which is also the source of the reference voltage $E_3$ as previously explained in connection with Figure 1.

The control winding 60 of the magnetic amplifier 52 is connected across the interpole winding 82 through the variable resistance 62, which provides a source of the control current $I_3$ for the limiting magnetic amplifier 52, the voltage drop $E_7$ across the interpole winding 82 being proportional to the load current $I_8$. The positive feedback winding 70 is connected through the variable resistance 72 across the load resistor 96 and the bucking field winding 98 which are, as previously mentioned, disposed in series across the output of the magnetic amplifier 52. The current $I_5$ flowing in the feedback winding 70 serves the same purpose as the feedback current previously described in connection with Figure 1. The presence of the bucking field winding for the generator 76, however, allows the generator voltage to be driven low enough when limiting occurs to stall the motor 92. Under normal operation however, when limiting is not occurring, the amount of excitation delivered by the bucking field winding 98 is negligible. It is only when limiting occurs that the excitation rises to the point that it has a substantial effect on the generator 76. The voltage $E_6$ across the output terminals of the secondary magnetic amplifier 52 will, of course, here again act as an IR drop compensation voltage below the point at which limiting occurs.

Referring now to Figure 5, a speed control circuit incorporating the invention is disclosed therein of substantially the same form as that shown in Figure 1. In this particular application, however, the output voltage $E_2$ of the magnetic amplifier 14 is applied directly to the armature of the controlled motor 92 which is again provided with a separately excited field winding 94. The control winding 42 of the magnetic amplifier 14 and the speed setting potentiometer 36 are connected so that the variable portion of the resistance of the potentiometer 36 is connected in series with the control winding 42 just as in the circuit shown in Figure 1. Likewise, the load resistor 48 is connected in series with the speed setting potentiometer 36 and all three elements, namely the control winding 42, the variable portion of the resistance of the speed potentiometer 36 and the load resistance 48 are connected in series across the armature of the controlled motor 92 so that the back E.M.F. therefrom becomes a bucking voltage with respect to the voltage $E_5$.

The control winding 60 of the secondary magnetic amplifier 52 is connected in series with the variable resistance 62 across the output terminals 100 and 102 of the bridge rectifier 104, the input terminals 106 and 108 of which are connected across the secondary winding 110 of a current transformer, indicated generally by the numeral 112, whose primary is connected in series with the supply line 12. This arrangement produces a current $I_3$ in the control winding 60 which is substantially proportional to the load current $I_8$ of the controlled motor. The positive feedback winding 70 in the secondary magnetic amplifier 52 is connected in series with the variable resistance 72 across the output of the secondary magnetic amplifier 52 and across the load resistance 48, so that the amount of positive feedback current $I_5$ can be adjusted by setting the variable resistance 72.

The operation of this embodiment of the invention is substantially the same as that described for the generic form of circuit shown in Figure 1.

Referring now to Figure 6, a circuit diagram of another embodiment of the invention which is adapted to limit the current to the controlled motor on deceleration, independently of the load inertia and change in speed of the motor, is shown. This arrangement is quite similar to that shown in Figure 4 except that the polarity of the output voltage $E_6$ of the limiting magnetic amplifier 52 has been reversed as well as the polarity of the control winding 60 thereof. This arrangement is designed to provide a current limiting action, if the speed setting potentiometer 36 is suddenly turned from a high setting to a lower setting. In such an instance, the output voltage of the generator 76 would be decreased rapidly which, of course, would cause the motor speed to also decrease. However, because of the inertia of the motor and its load, the motor speed cannot change instantaneously. Thus, the motor back E.M.F. is larger than the new voltage of the generator 76 and therefore, forces a heavy reverse current $I_{11}$ through the motor generator loop circuit, through which the current of the motor $I_{10}$ was previously flowing. This reverse current dynamically brakes the motor to the lower speed. Excessive values of $I_{11}$, however, endanger both the motor 86 and the generator 76 and it is, therefore, sometimes desirable to limit the value of $I_{11}$ during deceleration. The circuit disclosed in Figure 6 is so designed to automatically limit the value of $I_{11}$ to a preset maximum during deceleration.

The actual operation of the circuit requires that the output voltage $E_6$ of the secondary magnetic amplifier 52 be kept low under normal circumstances by the negative bias current $I_4$ flowing through the bias winding 66. The polarity of the control winding 60 of the magnetic amplifier 52 is such that, when the motor is decelerating and $I_{11}$ is flowing in the direction indicated in Figure 6, the current $I_3$ tends to saturate the limiting magnetic amplifier 52. When the limit value of $I_{11}$ and thus $I_3$ is reached, the output voltage $E_6$ of the magnetic amplifier 52 will rise suddenly and add to $E_7$. This will tend to increase the magnitude of $I_1$ flowing in the direction shown in Figure 6, thus causing $E_2$ to increase in magnitude which increased voltage is applied to the generator field 74. Such an increase in the exciting voltage of the generator 76 will cause the output voltage thereof to also increase and a maximum or limit value on the deceleration current $I_{11}$ will, therefore, automatically be maintained. The value of $I_{11}$ at which the limiting action occurs can be adjusted by means of the variable resistance 62.

The control signal across the interpole winding 82 is shown as the voltage $E_8$. A rectifier 116 is preferably placed in series with the control winding 60 to prevent current flowing in that winding except during deceleration when the polarity of $E_8$ is reversed, as indicated by the encircled polarity symbols in Figure 6.

The combination speed regulator and current limiting circuit, which is the subject matter of this invention, as illustrated in the above described embodiments, provides an adjustable yet automatic current limiting action on the direct current motor armature current, while at the same time providing an IR compensation voltage in the control feedback loop under normal operating conditions when limiting is not occurring. The ruggedness and long life of the components making up this circuit will give a long operating, trouble-free unit which, of course, is a decided commercial advantage.

Many changes in the specific form of the invention disclosed herein can be made without departing from the scope of these teachings. For instance, although the magnetic amplifiers have been shown as the full-wave, self-saturating, single-phase type, other suitable magnetic amplifier circuitry could be employed. Likewise, although specific means are shown for obtaining the control signal currents proportional to the armature current of the drive motor, other means could be used without departing from these teachings. It is also apparent that while the drive motors are shown provided with constant, separate excitation, other means of excitation could be substituted without departing from the scope of this invention, as defined in the following claims.

What is claimed is:

1. In a direct current motor drive system provided with a direct current power supply and with a closed loop circuit energized by the direct current power supply and including a motor speed voltage source and a reference voltage source for effecting control of motor speed in accordance with the current flow therein; a current limiting circuit for the closed loop comprising a magnetic amplifier with a direct current output; a control winding in said magnetic amplifier; means for producing and applying an E.M.F. proportional to said motor load current to said control winding in said magnetic amplifier; a positive feedback winding in said magnetic amplifier; means for producing and applying a feedback current to said positive feedback winding; a negative bias winding in said magnetic amplifier; means for producing and applying a negative bias voltage across said negative bias winding; and means for applying the output of said magnetic amplifier to said closed loop, said means for producing a feedback current and said means for producing a negative bias voltage being so adjusted that the magnitude of the current flowing in said closed loop is effected sharply by any increase in the motor load current above a selected value.

2. In a direct current motor drive system provided with a direct current power supply and with a closed loop circuit energized by the direct current power supply and including a motor speed voltage source and a reference voltage source for effecting control of motor speed in accordance with the current flow therein, a current limiting circuit for the closed loop comprising a magnetic amplifier with a direct current output; a control winding in said magnetic amplifier; means for producing and applying an E.M.F proportional to said motor load current to said control winding in said magnetic amplifier; a positive feedback winding in said magnetic amplifier; variable resistance means connected in series with said positive feedback winding across the output of said magnetic amplifier; a negative bias winding in said magnetic amplifier; and means for producing and applying a negative bias voltage across said negative bias winding; means for applying the output of said magnetic amplifier to said closed loop, said variable resistance and said means for producing a negative bias voltage being so adjusted that the magnitude of the current flowing in said closed loop is effected sharply by any increase in the motor load current above a selected value.

3. In a direct current motor drive system provided with a direct current power supply and with a closed loop circuit energized by the direct current power supply and including a motor speed voltage source and a reference voltage source for effecting control of motor speed in accordance with the current flow therein; a current limiting circuit for the closed loop comprising a magnetic amplifier with a direct current output; a control winding in said magnetic amplifier; means for producing and applying an E.M.F. proportional to said motor load current to said control winding in said magnetic amplifier; a positive feedback winding in said magnetic amplifier; variable resistance means connected in series with said positive feedback winding across the output of said magnetic amplifier; a negative bias winding in said magnetic amplifier; means for producing a direct current to be applied to said negative bias winding; a second variable resistance means connected in series with said negative bias winding across said means for producing a direct current; means for applying the output of said magnetic amplifier to said closed loop; said first and second variable resistance means being so adjusted that the magnitude of the current flowing in said closed loop is effected sharply by any increase in the motor load current above a selected value.

4. In a direct motor drive system provided with a direct current power supply and provided with a closed loop circuit energized by the direct current power supply and including a motor speed voltage source and a reference voltage source for effecting control of motor speed in accordance with the current flow therein, a current limiting circuit for the closed loop comprising a magnetic amplifier providing a direct current output from an alternating current source supplied over a pair of alternating current input lines; a control winding in said magnetic amplifier; a current transformer having a primary winding and a secondary winding, said primary winding being connected in series with one of the alternating current input lines to said speed control; means connecting the output of said secondary winding of said current transformer to a rectifying means; variable resistance means connected in series with the output of said rectifying means and said control winding of said magnetic amplifier; a positive feedback winding in said magnetic amplifier; means for producing and applying a feedback current to said positive feedback winding; a negative bias winding in said magnetic amplifier; and means for producing and applying a negative bias voltage across said negative bias winding; means connecting the output of said magnetic amplifier to said closed loop, said means for producing a feedback current and said means for producing a negative bias voltage being so adjusted that the magnitude of the current flowing in said closed loop is effected sharply by any increase in the motor load current above a selected value.

5. In a direct current motor drive system provided with a direct current generator having an interpole winding and with a generator exciter connected in a closed loop circuit including a motor speed voltage source and a reference voltage source for effecting control of motor speed in accordance with the current flow therein, a current limiting circuit for the closed loop comprising a magnetic amplifier with a direct current output; a control winding in said magnetic amplifier; a variable resistance connected in series with said interpole winding across said control winding of said magnetic amplifier; a positive feedback winding in said magnetic amplifier; means for producing and applying a feedback current to said positive feedback winding; a negative bias winding in said magnetic amplifier; means for producing and applying a negative bias voltage across said negative bias winding; and means for applying the output of said magnetic amplifier to said closed loop, said means for producing a feedback current and said means for producing a negative bias voltage being so adjusted that the magnitude of the current flowing in said closed loop is effected sharply by any increase in the motor load current above a selected value.

6. In a direct current motor drive system provided with a direct current generator having an interpole winding and a bucking field winding and provided with a generator exciter connected in a closed loop including a motor speed voltage source and a reference voltage source for effecting control of motor speed in accordance with the current flow therein, a current limiting circuit for the closed loop comprising a magnetic amplifier providing a direct current output from an alternating current source; a control winding in said magnetic amplifier; a variable resistance connected in series with said interpole winding across said control winding of said magnetic amplifier;

a positive feedback winding in said magnetic amplifier and a second variable resistance, both being connected in series across the output of said magnetic amplifier; means for producing a direct current output from said alternating current source; a resistance means connected across the direct current output of said last named means; means for connecting a selected variable portion of said resistance means in said loop to provide a reference voltage therefor; a second resistance means connected in series with said bucking field winding of said direct current generator in said loop; means connecting the output of said magnetic amplifier across said second resistance means and said bucking field winding in opposition to said reference voltage; a negative bias winding in said magnetic amplifier; and means for producing a negative bias voltage connected across said negative bias winding, said second variable resistance in series with said feedback winding in said magnetic amplifier and said means for producing a negative bias voltage being so adjusted that the magnitude of the current flowing in said closed loop is effected sharply by any increase in the motor load current above a selected value.

7. In a direct current motor drive system provided with a direct current generator having an interpole winding and provided with a generator exciter connected in a closed loop circuit including a motor speed voltage source and a reference voltage source for effecting control of motor speed in accordance with the current flow therein, a current limiting circuit for the closed loop comprising, a magnetic amplifier providing a direct current output from an alternating current source input; a control winding in said magnetic amplifier; a variable resistance and a rectifying means connected in series with said interpole winding across said control winding of said magnetic amplifier; a positive feedback winding in said magnetic amplifier and a second variable resistance means both connected in series across the output of said magnetic amplifier; means for producing a direct current output from said alternating current source; a resistance means connected across the direct current output of said last named means; means for connecting a selected variable portion of said resistance means in said loop to provide a reference voltage therefor; a second resistance means connected in said loop; means connecting the output of said magnetic amplifier across said second resistance means in adding relation to said reference voltage; a negative bias winding in said magnetic amplifier; and means for producing a negative bias voltage connected across said negative bias winding, said variable resistance in series with said feedback winding in said magnetic amplifier and said means for producing a negative bias voltage being so adjusted that the magnitude of the current flowing in said closed loop is effected sharply by any increase in the motor load current above a selected value.

8. A combination speed regulator and current limiting circuit for an electric motor comprising, a magnetic amplifier with an alternating current input and a direct current output; control winding means in said magnetic amplifier; means connecting the output of said magnetic amplifier to control the voltage applied across the armature of said motor; a source of voltage proportional to the speed of said motor; a source of reference voltage; means for connecting said motor speed voltage source and said reference voltage source in series opposition with the control winding of said magnetic amplifier for producing therein a current flow of a magnitude corresponding to the difference between said motor speed voltage and said reference voltage; a second magnetic amplifier with an alternating current input and a direct current output; a control winding in said second magnetic amplifier; means for producing an E.M.F. proportional to said motor load current connected to said control winding in said second magnetic amplifier; a positive feedback winding in said second magnetic amplifier; means for producing a feedback current connected to said positive feedback winding; a negative bias winding in said second magnetic amplifier; means for producing a negative bias voltage connected across said negative bias winding; and means connecting the output of said second magnetic amplifier in said series connection through the control winding of said first named magnetic amplifier, said means for producing a feedback current and said means for producing a negative bias voltage being so adjusted that the magnitude of the current flowing in said control winding of said first named magnetic amplifier is effected sharply by any increase in the motor load current above a selected value.

9. A combination speed regulator and current limiting circuit for an electric motor as set out in claim 8 further characterized in that said means connecting the output of said first named magnetic amplifier to control the voltage applied across the armature of said motor comprises a direct current generator; means connecting the output of said first named magnetic amplifier to the field winding of said direct current generator; an alternating current motor for driving said direct current generator and means connecting the output of said direct current generator across the armature of said electric motor.

10. A combination speed regulator and current limiting circuit for an electric motor comprising a magnetic amplifier with an alternating current input and a direct current output; control winding means in said magnetic amplifier; means connecting the output of said magnetic amplifier to control the voltage applied across the armature of said motor; means for producing a direct current from said alternating current input; a resistance means connected across said last named means; means for connecting a selected variable portion of said resistance means in series with said control winding to provide a reference voltage therefor; a second resistance means connected in series with said first named resistance means; means for connecting said control winding and said first and second named resistance means in series across the armature of said electric motor so that the back E.M.F. thereof is in opposition to said reference voltage; a second magnetic amplifier with an alternating current input and a direct current output; a control winding in said second magnetic amplifier; means for producing an E.M.F. proportional to said motor load current connected to said control winding in said second magnetic amplifier; a positive feedback winding in said second magnetic amplifier; means for producing a feedback current connected to said positive feedback winding; a negative bias winding in said second magnetic amplifier; means for producing a negative bias voltage connected across said negative bias winding; and means connecting the output of said second magnetic amplifier to said control winding of said first named magnetic amplifier, said means for producing a feedback current and said means for producing a negative bias voltage being so adjusted that the magnitude of the current flowing in said control winding of said first named magnetic amplifier is effected sharply by any increase in the motor load current above a selected value.

11. A combination speed regulator and current limiting circuit for an electric motor comprising a magnetic amplifier with an alternating current input and a direct current output; control winding means in said magnetic amplifier; means connecting the output of said magnetic amplifier to control the voltage applied across the armature of said motor; means for producing a direct current from said alternating current input; a resistance means connected across said last named means; means for connecting a selected variable portion of said resistance means in series with said control winding to provide a reference voltage therefor; a second resistance means connected in series with said first named resistance means; means for connecting said control winding and said first and second named resistance means in series across the armature of said electric motor so that the back E.M.F. thereof is in opposition to said reference voltage; a second magnetic amplifier with an alternating current input and a direct current output; a control winding in said second magnetic amplifier; means for producing an E.M.F. proportional to said motor load current connected to said control winding in said second magnetic amplifier; a positive feedback winding in said second magnetic amplifier; variable resistance means connected in series with said positive feedback winding across the output of said second magnetic amplifier; a negative bias winding in said second magnetic amplifier; means for producing a negative bias voltage connected across said negative bias winding; and means connecting the output of said second magnetic amplifier to said control winding of said first named magnetic amplifier; said variable resistance and said means for producing a negative bias voltage being so adjusted that the magnitude of the current flowing in said control winding of said first named magnetic amplifier is effected sharply by any increase in the motor load current above a selected value.

12. A combination speed regulator and current limiting circuit for an electric motor comprising a magnetic amplifier with an alternating current input and a direct current output; control winding means in said magnetic amplifier; means connecting the output of said magnetic amplifier to control the voltage applied across the armature of said motor; means for producing a direct current from said alternating current input; a resistance means connected across said last named means; means for connecting a selected variable portion of said resistance means in series with said control winding to provide a reference voltage therefor; a second resistance means connected in series with said first named resistance means; means for connecting said control winding and said first and second named resistance means in series across the armature of said electric motor so that the back E.M.F. thereof is in opposition to said reference voltage; a second magnetic amplifier with an alternating current input and a direct current output; a control winding in said second magnetic amplifier; means for producing an E.M.F. proportional to said motor load current connected to said control winding in said second magnetic amplifier; a positive feedback winding in said second magnetic amplifier; variable resistance means connected in series with said positive feedback across the output of said second magnetic amplifier; a negative bias winding in said second magnetic amplifier; a second variable resistance means connected in series with said negative bias winding across said means for producing a direct current; and means connecting the output of said second magnetic amplifier to said control winding of said first named magnetic amplifier; said first and second variable resistance means being so adjusted that the magnitude of the current flowing in said control winding of said first named magnetic amplifier is effected sharply by any increase in the motor load current above a selected value.

13. A combination speed regulator and current limiting circuit for an electric motor comprising a magnetic amplifier with an alternating current input and a direct current output; control winding means in said magnetic amplifier; means connecting the output of said magnetic amplifier to control the voltage applied across the armature of said motor; means for producing a direct current from said alternating current input; a resistance means connected across said last named means; means for connecting a selected variable portion of said resistance means in series with said control winding to provide a reference voltage therefor; a second resistance means connected in series with said first named resistance means; means for connecting said control winding and said first and second named resistance means in series across the armature of said electric motor so that the back E.M.F. thereof is in opposition to said reference voltage; a second magnetic amplifier with an alternating current input and a direct current output; a control winding in said second magnetic amplifier; a current transformer the primary winding of which is connected in series with one of the alternating current input lines to said first named magnetic amplifier; a means connecting the output of the secondary winding and said current transformer to a rectifying means; variable resistance means connected in series with the output of said rectifying means and said control winding of said second magnetic amplifier; a positive feedback winding in said second magnetic amplifier; means for producing a feedback current connected to said positive feedback winding; a negative bias winding in said second magnetic amplifier; means for producing a negative bias voltage connected across said negative bias winding; and means connecting the output of said second magnetic amplifier to said control winding of said first named magnetic amplifier; said means for producing a feedback current and said means for producing a negative bias voltage being so adjusted that the magnitude of the current flowing in said control winding of said first named magnetic amplifier is effected sharply by any increase in the motor load current above a selected value.

14. A combination speed regulator and current limiting circuit for an electric motor as set out in claim 13 further characterized in that the output of said first named magnetic amplifier is connected across the armature of said electric motor.

15. A combination speed regulator and current limiting circuit for an electric motor comprising a magnetic amplifier with an alternating current input and a direct current output; control winding means in said magnetic amplifier; a direct current generator; means connecting the output of said magnetic amplifier to the field winding of said direct current generator; an alternating current motor for driving said direct current generator; means connecting the output of said direct current generator across the armature of said electric motor; means for producing a direct current from said alternating current input; a resistance means connected across said last named means; means for connecting a selected variable portion of said resistance means in series with said control winding to provide a reference voltage therefor; a second resistance means connected in series with said first named resistance means; means for connecting said control winding and said first and second named resistance means in series across the armature of said direct current generator so that the output thereof is in opposition to said reference voltage; a second magnetic amplifier with an alternating current input and a direct current output; a control winding in said second magnetic amplifier; an interpole winding in said direct current generator and a variable resistance both connected in series across said control winding of said second magnetic amplifier; a positive feedback winding in said second magnetic amplifier; means for producing a feedback current connected to said positive feedback winding; a negative bias winding in said second magnetic amplifier; means for producing a negative bias voltage connected across said negative bias winding; and means connecting the output of said second magnetic amplifier to said control winding of said first named magnetic amplifier, said means for producing a feedback current and said means for producing a negative bias voltage being so adjusted that the magnitude of the current flowing in said control winding of said first named magnetic amplifier is effected sharply by any increase in the motor load current above a selected value.

16. A combination speed regulator and current limiting circuit for an electric motor comprising a magnetic amplifier with an alternating current input and a direct current output; control winding means in said magnetic amplifier; a direct current generator; means connecting the output of said magnetic amplifier to the field winding of said direct current generator; an alternating current motor for driving said direct current generator; means connecting the output of said direct current generator across the armature of said electric motor; means for producing a direct current from said alternating current input; a resistance means connected across said last named means; means for connecting a selected variable portion of said resistance means in series with said control winding to provide a reference voltage therefor; a second resistance means and a bucking field winding for said direct current generator connected in series with said first named resistance means; an interpole winding in said direct current generator in series with said armature; means for connecting said control winding, said first and second named resistance means, said bucking field winding, and said interpole winding in series across the armature of said direct current generator; a second magnetic amplifier with an alternating current input and a direct current output; a control winding in said second magnetic amplifier; a variable resistance connected in series with said interpole winding across said control winding of said second magnetic amplifier; a positive feedback winding in said second magnetic amplifier and a variable resistance means, both being connected in series across the output of said second magnetic amplifier; means connecting the output of said second magnetic amplifier across said second resistance means and said bucking field winding of said direct current generator in opposition to said reference voltage; a negative bias winding in said second magnetic amplifier; and means for producing a negative bias voltage connected across said negative bias winding, said variable resistance in series with said feedback winding in said second magnetic amplifier and said means for producing a negative bias voltage being so adjusted that the magnitude of the current flowing in said control winding of said first named magnetic amplifier is effected sharply by any increase in the motor load current above a selected value.

17. A combination speed regulator and current limiting circuit for an electric motor comprising a magnetic amplifier with an alternating current input and a direct current output; control winding means and said magnetic amplifier; a direct current generator; means connecting the output of said magnetic amplifier to the field winding of said direct current generator; an alternating current motor for driving said direct current generator; means connecting the output of said direct current generator across the armature of said electric motor; means for producing a direct current from said alternating current input; a resistance means connected across said last named means; means for connecting a selected variable portion of said resistance means in series with said control winding to provide a reference voltage therefor; a second resistance means connected in series with said first named resistance means; an interpole winding in said direct current generator in series with said armature; means for connecting said control winding, said first and second named resistance means, and said interpole winding in series across the armature of said direct current generator; a second magnetic amplifier with an alternating current input and a direct current output; a control winding in said second magnetic amplifier; a variable resistance and a rectifying means connected in series with said interpole winding across said control winding of said second magnetic amplifier; a positive feedback winding in said second magnetic amplifier and a variable resistance means both connected in series across the output of said second magnetic amplifier; means connecting the output of said second magnetic amplifier across said second resistance means in adding relation to said reference voltage; a negative bias winding in said second magnetic amplifier; and means for producing a negative bias voltage connected across said negative bias winding, said variable resistance in series with said feedback winding in said second magnetic amplifier and said means for producing a negative bias voltage being so adjusted that the magnitude of the current flowing in said control winding of said first named magnetic amplifier is effected sharply by any increase in the motor load current above a selected value.

References Cited in the file of this patent

UNITED STATES PATENTS

| 2,722,642 | Hunt | Nov. 1, 1955 |
| 2,785,360 | Abell et al. | Mar. 12, 1957 |

FOREIGN PATENTS

| 677,247 | Great Britain | Aug. 13, 1952 |
| 748,841 | Great Britain | May 9, 1956 |